Jan. 11, 1927.
A. AVERY
SPEEDWAY.
Filed March 19, 1926
1,613,866
2 Sheets-Sheet 1

INVENTOR.
Anthony Avery
BY
ATTORNEY.

Jan. 11, 1927.  
A. AVERY  
1,613,866  
SPEEDWAY  
Filed March 19, 1926  
2 Sheets-Sheet 2
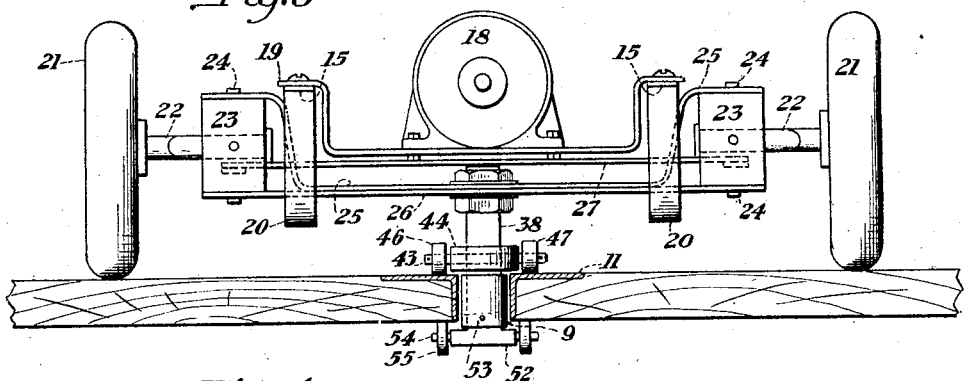
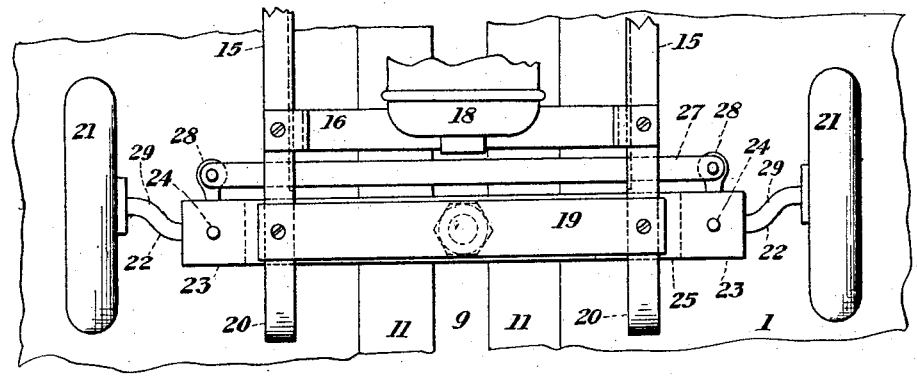
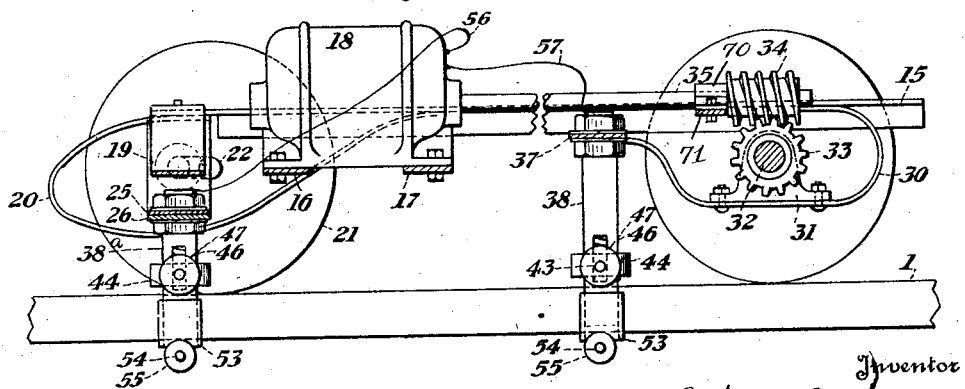

Patented Jan. 11, 1927.

1,613,866

UNITED STATES PATENT OFFICE.

ANTHONY AVERY, OF ROYAL OAK, MICHIGAN.

SPEEDWAY.

Application filed March 19, 1926, Serial No. 95,827, and in Canada April 9, 1925.

This invention relates to improvements in speedways, and more particularly to speedways having electrically propelled vehicles thereon.

It is an object of the invention to provide a speedway having a special arrangement of contacts, and whereon vehicles are adapted to travel as soon as the contacts on the speedway are energized, unless separate switches are provided on the vehicles themselves.

Another object of the invention is to provide specially constructed vehicles having downwardly projecting members towards their front and rear ends which pass through annular slots in the speedway and have rollers at their lower ends which bear against the under surface of the speedway. These downwardly extending members also have an arrangement of contact rollers thereon through which contacts are made between the contact strips on the speedway and a motor on each of the vehicles.

With these and other objects in view which will become apparent as the specification proceeds, the invention is hereinafter more fully described with the aid of the accompanying drawings and claimed.

Figure 3 illustrates the front elevation of a vehicle the body of which is not shown.

Figure 4 is a plan view of Figure 3.

Figure 5 is a longitudinal section of the vehicle, only the frame and special construction of which is shown.

Figure 1:
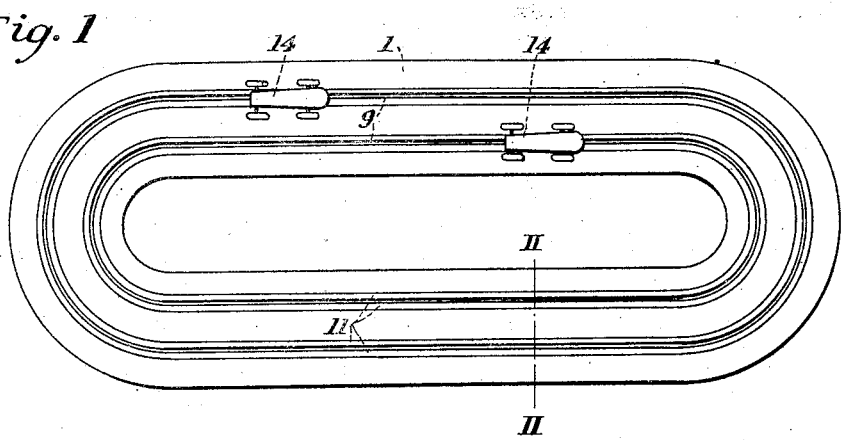
Figure 1 shows a plan view of the speedway.
Figure 2:
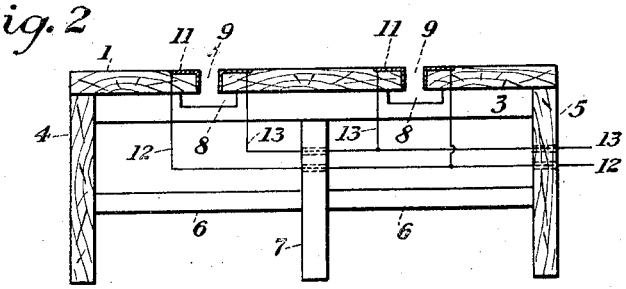
Figure 2 is a section on the line II—II of Figure 1.
Figure 6:
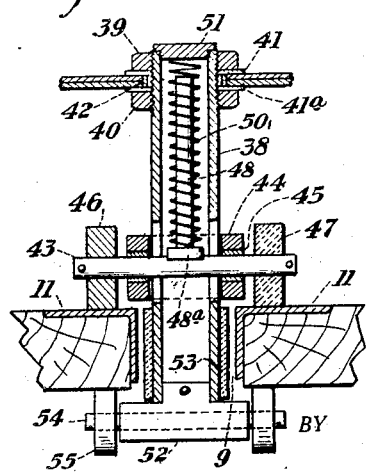
Figure 6 is a detail.

Referring more particularly to the drawings, the surface 1 of the speedway is generally supported by cross members 3, the outer and inner edges of which rest on side walls 4 and 5. Between these side walls and under the cross members braces 6 are arranged which extend from the outer and inner walls to the central support 7. Under the annular slots 9 in the surface of the speedway other slots 8 are provided in the cross members 3. On the surface of the speedway angle shaped contact strips 11 are provided on the edges of, and in, the annular slots 9. To each of these strips a lead 12 or 13 is attached, so that the strips on one side of the slots are connected to the positive wire and the strips on the other side of the slots to the negative wire. Moreover I prefer that the lower edges of the angle-shaped contact strips 11 should terminate slightly above the bottom of the surface 1.

The vehicles 14, which may be of any desired appearance, are built on frames 15 on which cross bars 16 and 17 are secured to carry the motor 18, and the front member 19 has the front ends of the spring 20 secured to it. The front wheels 21 have axles 22 which are supported in bearings 23 integral with which latter are lugs 24 pivotally mounted in the upper and lower cross members 25 and 26 respectively. A radius rod 27 connects the rearwardly projecting portions 28 of the bearings. The object of the offset 29 in the axles 22 is to facilitate turning.

The rear springs 30 connected at both ends to the frame 15 have bearings 31 mounted thereon which support the rear axle 32. On the latter a worm wheel 33 is fixed which meshes with a worm 34 on a shaft 35 which latter is rotated by the motor 18. The shaft 35 is supported in proximity to the worm 34 by a bearing 70 mounted on a rear cross member 71.

The brackets to which the front ends of the rear springs 30 are connected also support the cross member 37 to which the downwardly extending guide 38 is attached.

The guide 38 is threaded at its upper end to receive the nuts 39 and 40 located above and below the cross member 37 from which latter the guide is insulated by the washers 41 and 41ᵃ and the annular distance piece 42. The guide is hollow and is slotted on both sides for the shaft 43 to pass therethrough. The annular bearing 44 around the guide and adapted to move vertically thereon has bushings 45 therein to support the shaft 43. At each end of the shaft a disc is mounted, one of which 46 is made of metal or some conducting material and rests on one of the strips 11, and the other disc 47 is made of insulating material and rests on the opposite strip 11. In the guide a pin 48 is located the lower end of which is of larger diameter and rests on the top of the shaft 43. Around the pin is a helical spring 50 which extends from the plug 51 in the top of the guide to the lower end 48ᵃ of the pin and holds the latter in contact with the shaft 43. In the lower end of the guide is a T-shaped fitting 52 which supports the insulating roller 53 mounted around the lower end of the guide. This fitting also has a shaft 54 therethrough on which rollers 55 are rotatably mounted. These rollers are adapted to bear against the underside of the speedway, and are preferably so positioned as normally to be just clear of the said underside so as to allow the vehicle to lean sideways when taking the curves. The slots in the sides of the guide allow the shaft 43 to move either vertically or at an angle to the guide for the same reason. The arrangement of the front guide 38ª is exactly similar to the rear guide 38.

It will be noted that whereas the contact disc 46 bears on the left hand strip 11 from the rear guide 38, the contact disc 46 on the front guide 38ª is located on the right hand strip, so that one guide is connected to the positive and the other to the negative lead. Wires 56 and 57 are connected to the top of the plugs 51 in the upper ends of the guides 38ª and 38 respectively and also the motor terminals. The object of this arrangement is so that the vehicles may run in either direction on the speedway.

Obviously the distance is greater around the outer track than it is around the inner one, this however can be compensated for in various ways. Either the speed of the motors may be varied or the car on the inner track may be weighted so as to retard its progress.

From the foregoing it will be seen that I have devised a speedway from which the young can obtain considerable amusement and at the same time learn something regarding both mechanics and electricity.

Having thus described my invention, what I claim and desire to secure by Letters Patent is:

1. An article of the class described comprising a speedway having annular slots therein, and annular contact strips on said speedway one on each side of each of said slots, in combination with vehicles adapted to travel around said speedway, downwardly projecting guides from said vehicles, discs revolvably mounted in said guides and adapted to rotate on said strips, and rollers so mounted on the underside of said guides as to be adapted to bear against the underside of said speedway.

2. An article of the class described comprising a speedway having annular slots therein, and contact strips one on each side of each of said slots, in combination with vehicles adapted to travel around said speedway, a motor having terminals thereon on each vehicle, downwardly projecting guides attached one behind the other on each vehicle and insulated therefrom, discs on said guides adapted to travel on said strips, contacts being made from one of said strips to the front guide and from the other of said strips to the rear guide through said discs, and connections from said guides to said motor terminals.

3. An article of the class described comprising a speedway having annular slots therein, and contact members one on each side of each of said slots, in combination with vehicles adapted to travel around said speedway, a motor having terminals thereon on each vehicle, downwardly projecting guides attached one behind the other to said vehicles, closure members in the upper ends of said guides, axles rotatably mounted through said guides, pins in said guides having enlarged lower ends which rest on said axles, springs around said pins contacting the closed upper ends of said guides and forcing the enlarged lower ends of said pins against said axles, a contact disc and an insulating disc on each axle, said discs being so arranged that the two contact discs on each vehicle bear against opposing strips, and connections from said guides to said motor terminals.

4. An article as described in claim 1 wherein one of the discs revolvably mounted on each of the guides on each vehicle is made of conducting material and the opposing discs are made of insulating material, and the discs are so arranged that the conducting disc is on one side of the vehicle on one guide and on the opposite side of the vehicle on the other guide.

5. An article of the class described comprising a speedway having annular slots therein, and contact members one on each side of each of said slots, in combination with vehicles adapted to travel around said speedway, a motor mounted on each vehicle, a drive shaft connected to each motor and having a worm thereon, a worm wheel on each rear axle cooperating with its worm, offset front axles, guides dependingly attached from the front and rear of each vehicle, and contact discs revolvably mounted on said guides adapted to rotate on said strips as the vehicles travel around said speedway.

6. An article as described in claim 5 wherein axles on which the discs are mounted are adapted to move vertically in their guides and to be inclined at varying angles to their guides.

ANTHONY AVERY.